US009175797B1

(12) United States Patent
Behoteguy

(10) Patent No.: US 9,175,797 B1
(45) Date of Patent: Nov. 3, 2015

(54) CONDUIT COVER WITH WEDGING ARMS

(75) Inventor: David W. Behoteguy, Brea, CA (US)

(73) Assignee: Plastek Engineering, Brea, CA (US)

( * ) Notice: Subject to any disclaimer, the term of this patent is extended or adjusted under 35 U.S.C. 154(b) by 688 days.

(21) Appl. No.: 13/548,027

(22) Filed: Jul. 12, 2012

(51) Int. Cl.
*F16L 55/10* (2006.01)
*F16L 55/128* (2006.01)
*F16L 55/136* (2006.01)
*E03F 5/06* (2006.01)
*F16L 55/115* (2006.01)

(52) U.S. Cl.
CPC . *F16L 55/10* (2013.01); *E03F 5/06* (2013.01); *F16L 55/115* (2013.01); *F16L 55/128* (2013.01); *F16L 55/136* (2013.01)

(58) Field of Classification Search
None
See application file for complete search history.

(56) References Cited

U.S. PATENT DOCUMENTS

| | | | | |
|---|---|---|---|---|
| 402,600 | A * | 5/1889 | Kemp | 220/235 |
| 864,884 | A * | 9/1907 | Capaldi | 210/463 |
| 929,727 | A * | 8/1909 | Sullivan | 4/292 |
| 969,776 | A * | 9/1910 | Foley | 137/371 |
| 1,653,403 | A * | 12/1927 | McCue | 138/96 R |
| 2,433,423 | A | 12/1947 | Broadman | |
| 2,773,554 | A * | 12/1956 | Lindorf | 138/90 |
| 2,800,231 | A * | 7/1957 | Hicks | 210/463 |
| 3,727,763 | A | 4/1973 | Arenskov | |
| 3,747,541 | A * | 7/1973 | Reese | 109/50 |
| 3,870,085 | A * | 3/1975 | Schneider | 138/93 |
| 4,215,951 | A * | 8/1980 | Knox | 405/203 |
| 4,303,101 | A * | 12/1981 | Tholen | 138/89 |
| 4,493,344 | A | 1/1985 | Mathison | |
| 4,723,440 | A * | 2/1988 | Bershausen | 73/40 |
| 4,799,713 | A * | 1/1989 | Uglow | 285/42 |
| 4,968,197 | A * | 11/1990 | Chen | 411/34 |
| 4,982,764 | A * | 1/1991 | Saxon | 138/89 |
| 5,035,265 | A * | 7/1991 | Chen | 138/89 |
| 5,044,403 | A * | 9/1991 | Chen | 138/89 |
| 5,141,633 | A * | 8/1992 | Walczak et al. | 210/163 |
| 5,297,817 | A * | 3/1994 | Hodges | 285/15 |
| 5,564,860 | A * | 10/1996 | Amann | 405/118 |
| 5,695,222 | A | 12/1997 | Hodges | |
| 5,966,884 | A * | 10/1999 | Uglow | 52/302.1 |
| 5,975,142 | A | 11/1999 | Wilson | |
| 6,092,244 | A * | 7/2000 | Rizzardi et al. | 4/286 |
| 6,154,898 | A | 12/2000 | Ball | |
| 6,165,357 | A * | 12/2000 | Cormier | 210/163 |
| 6,360,379 | B1 * | 3/2002 | Lane et al. | 4/507 |
| 6,453,603 | B1 * | 9/2002 | Baker | 43/124 |
| 6,725,468 | B2 | 4/2004 | Molina | |
| 8,894,850 | B2 * | 11/2014 | Coscarella | 210/164 |
| 2011/0120924 | A1 | 5/2011 | Coscarella | |
| 2011/0168711 | A1 | 7/2011 | Coscarella | |

FOREIGN PATENT DOCUMENTS

| | | |
|---|---|---|
| IT | RM 950187 | 6/1995 |
| JP | 2006045881 | 2/2006 |

* cited by examiner

*Primary Examiner* — Robert J Popovics
(74) *Attorney, Agent, or Firm* — Patent Law & Venture Group; Gene Scott

(57) ABSTRACT

A locking grating or seal for a conduit includes a cover positioned at one open end of the conduit and is removably engaged and axially aligned with, an expander positioned within the conduit. A jacking bolt penetrates the cover and the expander, and is threadedly engaged with a jacking nut in a position within the conduit and spaced apart from the expander. C-shaped elastically flexible arms are integrally engaged with the expander and with the jacking nut so that rotation of the jacking bolt enables the jacking nut to move toward the expander forcing the C-shaped arms to bow outwardly into contact with the conduit for gripping it.

5 Claims, 6 Drawing Sheets

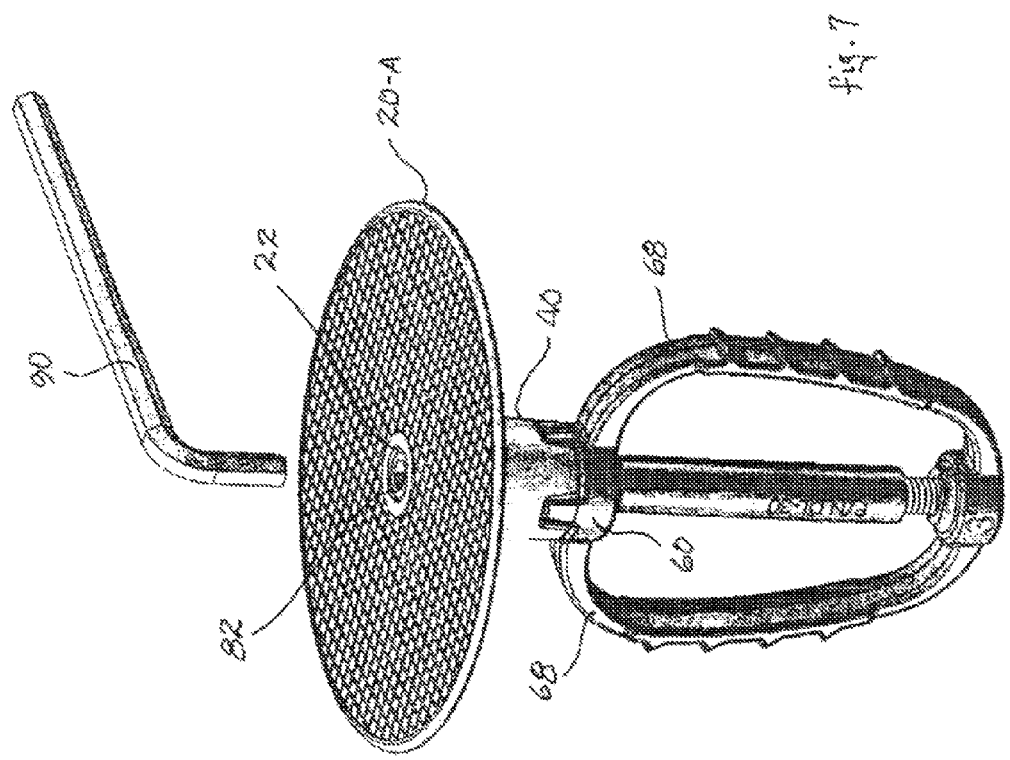

CONDUIT COVER WITH WEDGING ARMS

No federally sponsored research or development, and no sequence listing, table, or computer program listing compact disc appendix is applicable to this application.

BACKGROUND

This disclosure relates to the field of drains for liquid flows, and more particularly to a removable floor drain grating having a mechanism for locking the grating in place over a drain pipe and which is unlocked only by use of a tool so as to prevent casual removal of the grating which may lead to undesired clogging due to drain pipe stuffing, that is, allowing large amounts of materials to enter the drain pipe. The same locking mechanism may be used with a cover for sealing the open end of a drain pipe or any similar pipe when the grating is replaced with a cover plate without any pass-through apertures, i.e., without openings therein.

A drain grating or covering is conceived as a plate that may be fitted over a drain pipe or conduit, and which may have plural openings in it, each generally smaller than the span of the drain pipe itself. Its purpose is to prevent large items from entering the drain pipe which may clog it. A grate may also be constructed as a series of spaced apart rigid bars as a lattice or as a screen such as one made of expanded metal sheeting or the like. In general, a drain grate is a filter. Drain grates usually become covered or engaged with the large items which they are designed to prevent from entering the drain pipe so that they must be periodically cleared which may require temporary removal from the drain pipe. In commercial kitchens, floors are generally hosed down to assure meeting cleanliness standards. Items such as foodstuffs, packaging materials, and the like are carried by water flows to floor drains and if allowed to enter the drain pipes, clogs may occur. To prevent this, such items must be removed from the drain grate manually in order to have a free flow of water. Kitchen help may resort to removing a drain grate in order to allow such items to enter the drain pipe thereby shortening kitchen cleanup time. This practice often results in drain pipe clogging requiring expensive steps in clearing such clogs. To help prevent this, a locking drain pipe grating may be used; one that is not easily removed. The prior art discloses various means for locking a cover onto a drain or other cylindrical conduit including types described in the following. As said, such locking mechanisms are equally useful in sealing a cover plate onto the end of a pipe to prevent anything from passing into or out of the pipe.

The prior art discloses a ratchet type closet flange for replacing broken cast iron closet flanges in old buildings or in new construction in place of conventional cast iron closet flanges. Such a device includes a flange body, a cup, a rubber seal, and a means for applying pressure such as a central bolt. After removing the broken closet flange, the ratchet type closet flange is inserted into the existing pipe. A compression seal is formed between the flange body and the inside of the pipe by applying pressure to the flange body and the cup using a central bolt, thereby forcing a compression relationship between the rubber seal and the pipe. The ratchet type closet flange may slide up and down inside the pipe to achieve a desired height.

The prior art also discloses various drain covers with looking mechanisms including those having a cylindrical body with a peripheral sidewall. Wedge members are movable from a release position to a locking position by use of a central screw or jacking mechanism. In the release position each wedge member is positioned at one end of the peripheral sidewall. In the locking position each wedge member is moved upwardly into contact with an opposing end of the peripheral sidewall so that an exterior surface of the peripheral sidewall wedges within the cylindrical body.

The presently described apparatus incorporates an advance over prior art concepts providing a locking grating or sealing cover with novel benefits in manufacture and operation as will be described below.

BRIEF SUMMARY AND OBJECTIVES

The present disclosure describes an apparatus and method for producing a drain pipe grating and locking system for holding the drain grating in place over the drain pipe. The apparatus Advantages of the presently disclosed subject include The details of one or more embodiments of these concepts are set forth in the accompanying drawings and the description below. Other features, objects, and advantages of these concepts will be apparent from the description and drawings, and from the claims.

BRIEF DESCRIPTION OF THE SEVERAL VIEWS OF THE DRAWING

FIG. 7 is an example top perspective view of the presently described apparatus as adapted for use in a second application.

Like reference symbols in the various views indicate like elements.

DETAILED DESCRIPTION

Figure 1:
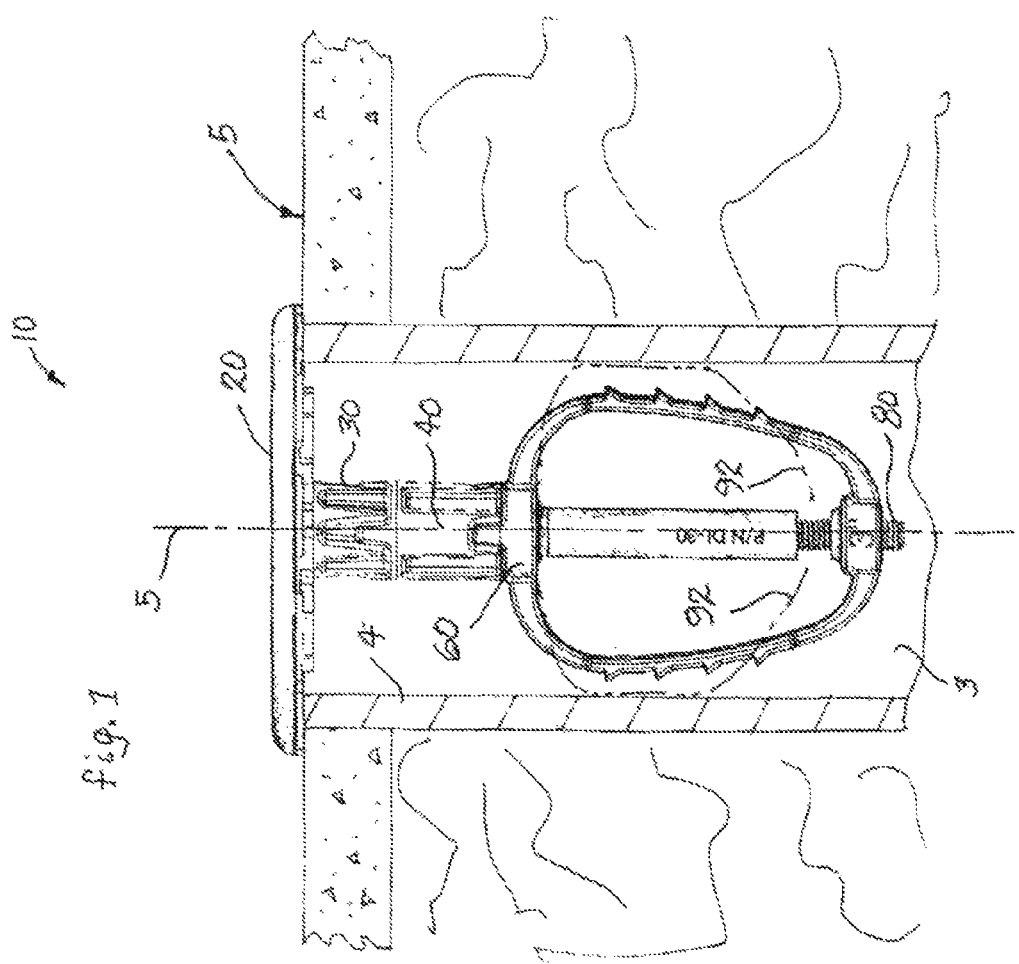
FIG. 1 is an example front elevational view of the presently described apparatus as adapted for use in a first application and shown with a partial vertical section of an environment thereof.
Figure 2:
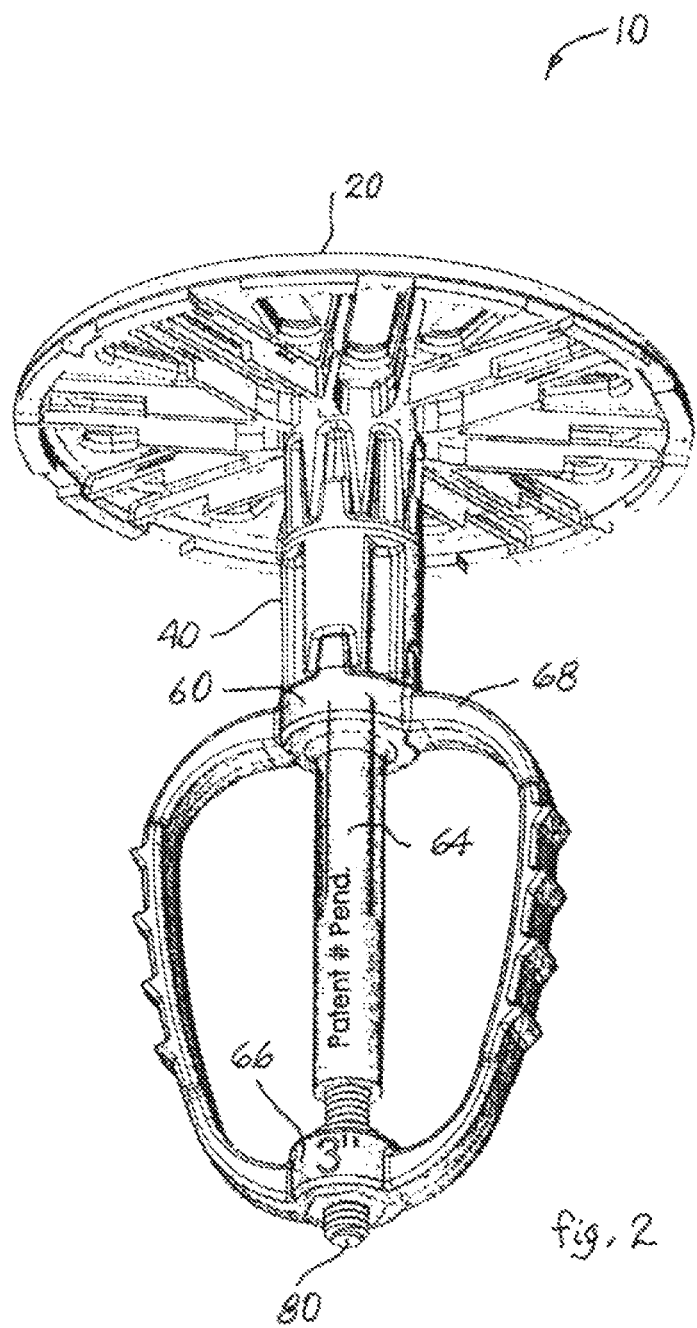
FIG. 2 is an example bottom perspective view of said apparatus.

FIG. 1 shows the presently described apparatus 10 positioned at one end of, and extending into a conduit 3 which is set into a concrete floor structure. Alternatively, the conduit may be a pipe, a tube or may also be a hollow space within a structure such as a round opening in a concrete wall, ceiling or floor as for example. FIG. 2 shows a relationship between the several elements of the apparatus 10, namely: a disc-shaped cover 20, an extender 40, an expander 60 and a jacking bolt 80. The cover 20, extender 40, and expander 60 are secured together by the engagement jacking bolt 80 which is centrally positioned and defines a central axis 5 (FIG. 1) about which the several elements are arranged in a linear series as shown. A head 82 (FIG. 6) of jacking bolt 80 is positioned within a recess 22 (FIG. 7) of cover 20 and a shaft 84 of jacking bolt 80 extends downwardly therefrom through elements 20, 40, and 60 whereupon a threaded portion 86 of shaft 84 engages a jacking nut 62 as shown in FIG. 6 and this holds the several elements of apparatus 10 together as an assembly.

Figure 3:
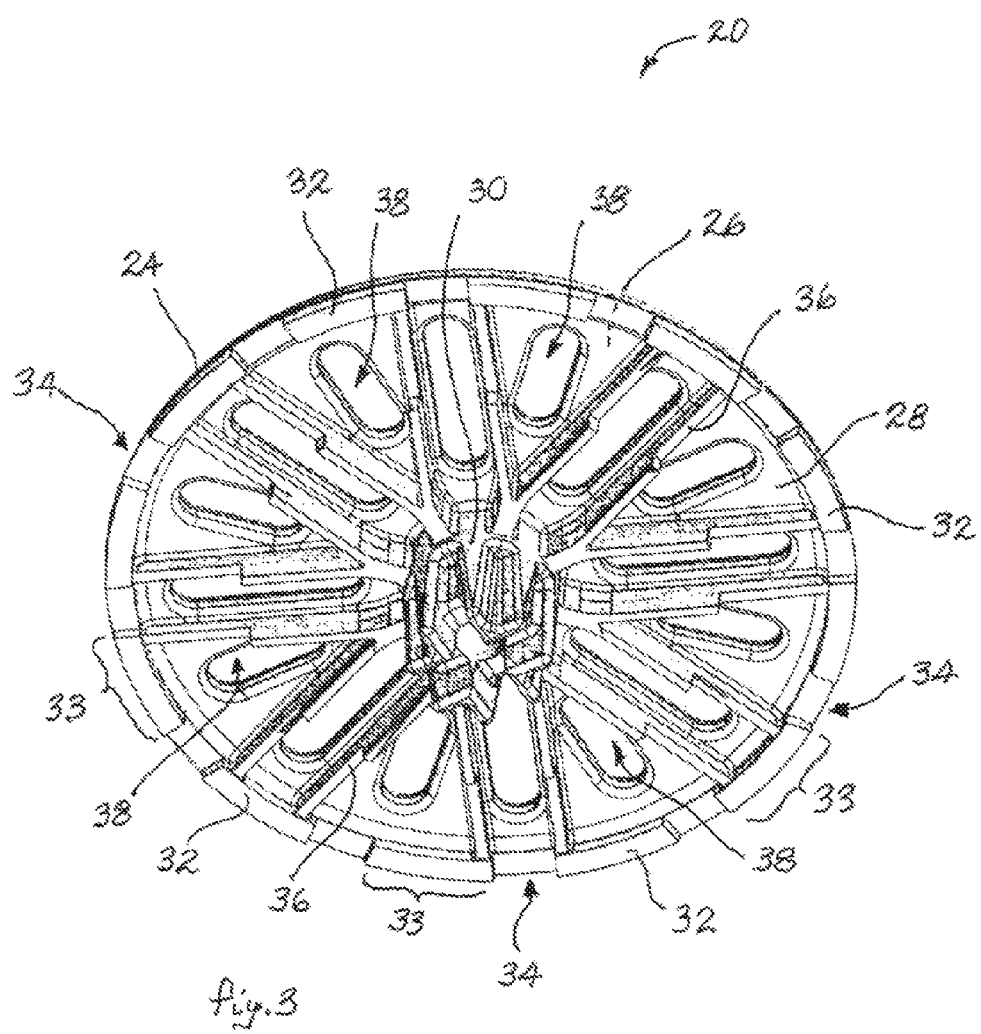
FIG. 3 is an example bottom perspective view of a grating thereof.

FIG. 3 illustrates one embodiment of cover 20 which is used as a drain grate. In this embodiment, cover 20 may have an outside peripheral edge 24, a top surface 26, a bottom surface 28, and a centrally positioned first spline 30. On the bottom surface 28, a lip 32 may be positioned adjacent to peripheral edge 24. Lip 32 may be made up of a plurality of segments 33 with spaces 34 between them as shown so that water may pass into conduit 3 directly from the floor surface 5. The bottom surface 28 may also have integral near-radially positioned webs 36 extending between the centrally positioned first spline 30 and the peripheral edge 24. The webs 36 may be formed in relief to the bottom surface 28. Such webs 36 provide strength to the cover 20. Furthermore, the cover 20 may have plural openings 38 extending between the top surface 26 and the bottom surface 28, so that the cover 26 may function as a grating. FIG. 7 shows the cover 20 in a further embodiment where it is used as a sealing cap over an open end of conduit 3. In this embodiment there are no openings 38 or perforations.

Figure 4:
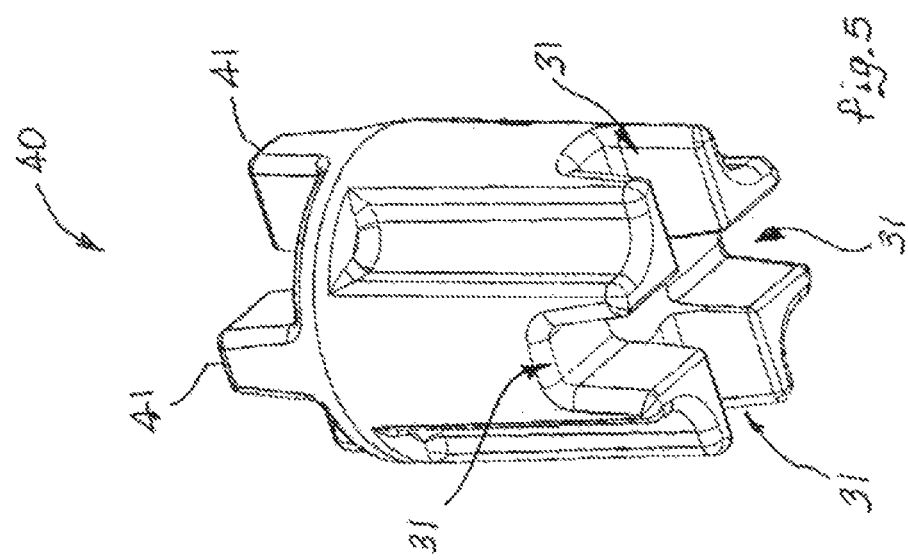
FIG. 4 is an example top perspective view of an extender thereof.
Figure 5:
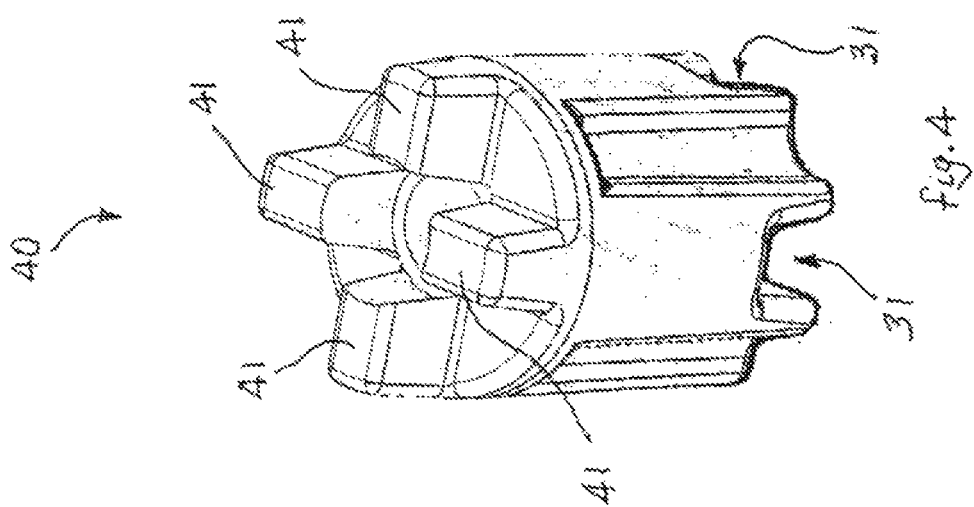
FIG. 5 is an example bottom perspective view of said extender.

It should be noted, as shown in FIG. 5, that first spline 30 has several spline-slots 31. Four slots 31 are shown but less or more slots 31 may be employed. FIGS. 4 and 5 show the extender 40 which may be an elongated rod-like solid part with spline-fingers 41 at one end, shown best in FIG. 4, and with spline-slots 31 at the opposing end, shown best in FIG. 5. It is shown in FIGS. 1 and 2 that the spline-slots 31 of first spline 30 may be engaged with the spline-fingers 41 of extender 40. Likewise, identical spline fingers 41 of expander 60 may be engaged with first spline 30. The spline-slots 31 of cover 20 may be identical to the spline-slots 31 of extender 40. Therefore, the extender 40 may be left out of the assembly without loss of function and in practice, extender 40 is used to position expander 60 at a selected position within conduit 3. The term "spline" is used here and is shown in the several figures to define and illustrate one possible means for coupling cover 20 with either extender 40 or expander 60 and also, to couple extender 40 with expander 60. However, alternate means for coupling these elements may be employed as would be known to those of skill in the art. Therefore the term "spline" is meant to take the broader meaning of "coupling device" in this description and in the following claims.

Figure 6:
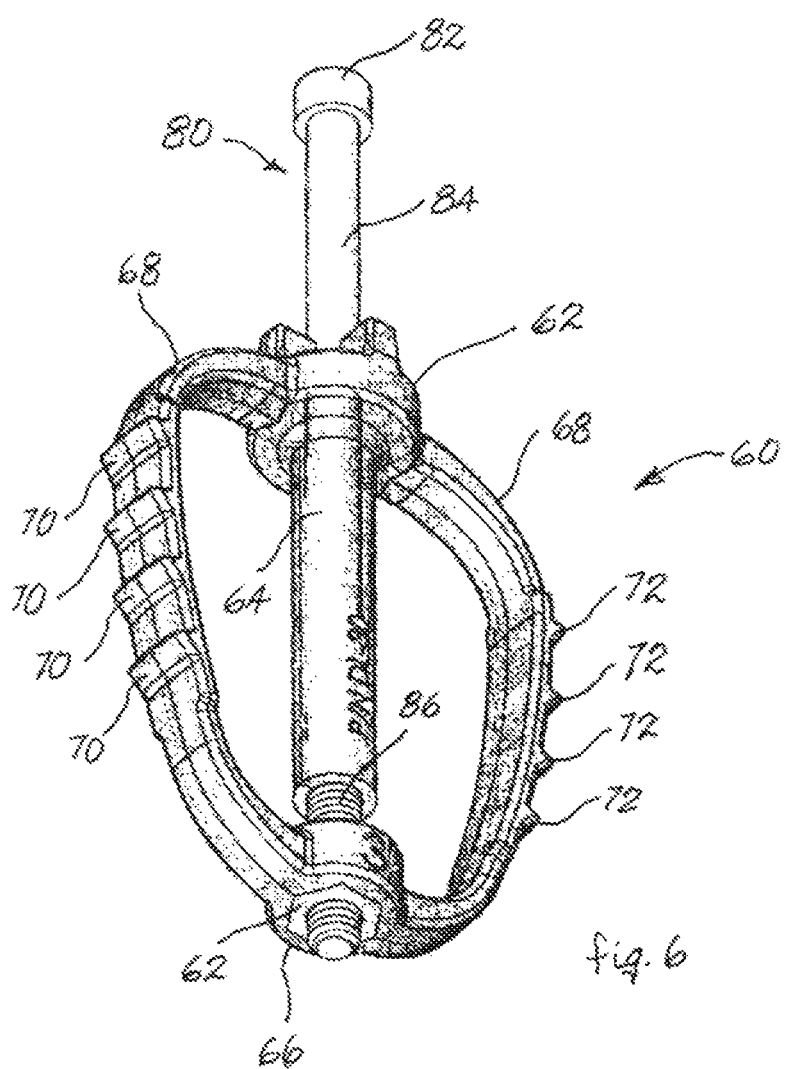
FIG. 6 is an example perspective view of an expander of the apparatus, the expander shown with an engagement jacking bolt secured therewith.

FIG. 6 illustrates the engagement jacking bolt 80 secured within the expander 60. The expander 60 has a second spline 63, an elongated tubular portion 64, a jacking nut receiver 66, and a pair of opposing flexible C-shaped arms 68. Each of the arms 68 have plural gripping claws 70 arranged one below the next, as for instance the four claws 70 shown. The claws 70 may have relatively sharp terminal edges 72 for gripping the interior surface of conduit 3.

It should be noted, as shown in FIG. 1, that cover 20 is in contact with one end of conduit 3 and may also be in contact with a floor surface 5; and that elements 30 and 40 may extend downwardly within conduit 3 to some distance below the floor surface 5. Extender 40 may be removed from the assembly so that the spline portion of expander 60 may be engaged directly with the spline portion 30 of cover 20 with the result that the ribs 70 will be positioned higher within conduit 3. Likewise, extender 40 may be made at any selected length and used in the assembly in order to position the ribs 70 at a desired vertical location within conduit 3. When engagement screw 80 is rotated in a first rotational sense as with the wrench 90 shown in FIG. 7, the jacking nut 62 may be drawn upward and the arms 68 will be forced to bow laterally outward into positions shown by broken lines 92, that is, into contact with the interior walls 4 of conduit 3. In this case, the sharp claws 72 of ribs 70 tend to grip the walls of conduit 3 thereby locking the assembly within conduit 3. When screw 80 is rotated in a second (opposite) rotational sense the reverse occurs, that is, the material of which the expander 60 is made has a resiliency that allows the arms 68 to resume their original shape each time tension is removed. In this case, the assembly may be removed from conduit 3, but may later be again locked in place within conduit 3. It should be further noted that instead of two arms 68, three, four or more said arms 68 may be used in order to improve the holding power of the assembly within conduit 3.

The expander 60 is fabricated by high pressure injection molding. Expander 60 must be a relatively rigid part since when jacking nut receiver 66 is drawn into engagement with tubular portion 64, the latter must not fail to stop the advancement of jacking nut receiver 66. Such a failure could cause an overstressed condition on arms 68 and possible failure. Also, arms 68 must have elastic resiliency so that they can bow out as needed, and yet resume the non-bowed shape when jacking nut is drawn away from tubular portion 64. Means they must not take a set even after long periods of time (weeks, months). This combination of physical rigidity and elastic resiliency is not common in engineering structural plastics. However, it is achieved using a mixture of approximately equal parts of polycarbonate plastic, and polyester plastic so that the finished part has a flexure modulus of between 220,00 and 320,000 psi, a tensile stress at its yield point of greater than 5,000 psi, a tensile elongation at break point of greater than 50%, and a notched Izod impact of greater than 8 ft-lb/in. This combination of physical characteristics has been found to be critical to successfully meeting the above stated objectives of this apparatus.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. An apparatus for covering a conduit, the apparatus having a central axis of rotation, the apparatus comprising:
   a cover having an integral and axially aligned first spline;
   an expander having a second spline in axial alignment and mutual engagement with the first spline, the expander further having at least two C-shaped arms with one end of each of the arms engaged integrally with the second spline, and with a further end of each of the arms engaged with an axially positioned jacking nut; and
   an axially aligned jacking bolt penetrating the cover and the expander, and threadedly engaged with the jacking-jacking nut;
   wherein, rotation of the jacking-jacking bolt enables the jacking-jacking nut to move toward the expander and enables the C-shaped arms to bow outwardly for contact with an interior surface of the conduit thereby mutually securing the apparatus and conduit together.

2. The apparatus of claim 1 further comprising an axially aligned extender positioned between the cover and the expander, the extender having opposing further splines engaged with the splines of the cover and the expander.

3. The apparatus of claim 1 wherein the cover is one of a drain grating and a sealing cap.

4. The apparatus of claim 1 wherein the expander is made of at least one of: a glass mineral filled polypropylene, and a polycarbonate and polyester blend.

5. The apparatus of claim 1 wherein each of the C-shaped arms has plural outwardly extending claws.

* * * * *